US009850172B2

(12) United States Patent
Wu et al.

(10) Patent No.: US 9,850,172 B2
(45) Date of Patent: Dec. 26, 2017

(54) CERAMIC POWDER, METHOD OF MANUFACTURING THE SAME, AND METHOD FOR LASER SINTER MOLDING

(71) Applicant: INDUSTRIAL TECHNOLOGY RESEARCH INSTITUTE, Hsinchu (TW)

(72) Inventors: Yu-Han Wu, Taipei (TW); Kuo-Chuang Chiu, Hsinchu (TW)

(73) Assignee: INDUSTRIAL TECHNOLOGY RESEARCH INSTITUTE, Hsinchu (TW)

(*) Notice: Subject to any disclaimer, the term of this patent is extended or adjusted under 35 U.S.C. 154(b) by 260 days.

(21) Appl. No.: 14/883,235

(22) Filed: Oct. 14, 2015

(65) Prior Publication Data
US 2016/0115083 A1 Apr. 28, 2016

Related U.S. Application Data

(60) Provisional application No. 62/067,539, filed on Oct. 23, 2014.

(51) Int. Cl.
C04B 35/486 (2006.01)
C04B 35/14 (2006.01)
C04B 35/626 (2006.01)
C04B 35/64 (2006.01)
C04B 35/628 (2006.01)
C04B 35/117 (2006.01)
C04B 35/488 (2006.01)
C04B 35/634 (2006.01)

(52) U.S. Cl.
CPC ...... C04B 35/62655 (2013.01); C04B 35/117 (2013.01); C04B 35/488 (2013.01); C04B 35/62807 (2013.01); C04B 35/62892 (2013.01); C04B 35/63416 (2013.01); C04B 2235/3203 (2013.01); C04B 2235/3206 (2013.01); C04B 2235/3217 (2013.01); C04B 2235/3225 (2013.01); C04B 2235/3246 (2013.01); C04B 2235/3418 (2013.01); C04B 2235/5436 (2013.01); C04B 2235/665 (2013.01); C04B 2235/96 (2013.01); C04B 2235/963 (2013.01); C04B 2235/9607 (2013.01)

(58) Field of Classification Search
CPC .... C04B 2235/3203; C04B 2235/3206; C04B 2235/3217; C04B 2235/3225; C04B 2235/3246; C04B 2235/3418; C04B 2235/5436; C04B 2235/665; C04B 2235/96; C04B 2235/9607; C04B 2235/963; C04B 35/117; C04B 35/488; C04B 35/62655; C04B 35/62807; C04B 35/62892; C04B 35/63416
See application file for complete search history.

(56) References Cited

U.S. PATENT DOCUMENTS

| 4,222,373 | A  | 9/1980  | Davis          |
|-----------|----|---------|----------------|
| 4,943,612 | A  | 7/1990  | Morita et al.  |
| 6,087,280 | A  | 7/2000  | Beall et al.   |
| 6,209,352 | B1 | 4/2001  | Beall et al.   |
| 6,465,380 | B1 | 10/2002 | Beall et al.   |
| 6,921,431 | B2 | 7/2005  | Evans et al.   |
| 7,065,984 | B2 | 6/2006  | Kezuka et al.  |
| 7,105,047 | B2 | 9/2006  | Simmons et al. |
| 7,208,446 | B2 | 4/2007  | Stamires et al.|
| 7,280,028 | B2 | 10/2007 | Nelson et al.  |
| 7,604,882 | B2 | 10/2009 | Kenzuka et al. |
| 7,736,770 | B2 | 6/2010  | Kesuka et al.  |
| 7,968,756 | B2 | 6/2011  | Olver et al.   |
| 8,636,946 | B1 | 1/2014  | Olver          |
| 8,658,013 | B2 | 2/2014  | Wang et al.    |
| 8,693,853 | B2 | 4/2014  | Olver et al.   |
| 2006/0199045 | A1 | 9/2006 | Kezuka et al. |
| 2007/0160859 | A1 | 7/2007 | Darolia et al. |
| 2007/0294881 | A1 | 12/2007 | Nelson et al. |
| 2009/0252660 | A1 | 10/2009 | Olver et al.  |
| 2009/0293786 | A1 | 12/2009 | Olver         |
| 2010/0038061 | A1 | 2/2010  | Olver et al.  |

(Continued)

FOREIGN PATENT DOCUMENTS

| CN | 1268584 A | 10/2000 |
|----|-----------|---------|
| CN | 1785869 A | 6/2006  |

(Continued)

OTHER PUBLICATIONS

Taiwanese Office Action and Search Report, dated Mar. 14, 2016, for Taiwanese Application No. 104133651.

(Continued)

Primary Examiner — Alexandre F Ferre
(74) Attorney, Agent, or Firm — Birch, Stewart, Kolasch & Birch, LLP

(57) ABSTRACT

Disclosed is a method of manufacturing a ceramic powder, which includes forming a slurry by mixing of first ceramic particles, binder and water, spraying and drying the slurry to form a first ceramic core portion, and thermally treating and shaping the first ceramic core portion. The first ceramic core portion has a first flexural strength and a first coefficient of thermal expansion. The method further includes forming another slurry to form a second ceramic shell portion formed by second ceramic particles and covering the first ceramic core portion. The second ceramic shell portion has a second flexural strength and a second coefficient of thermal expansion. The ceramic powder is formed by thermally treating and shaping the first ceramic core portion and the second ceramic shell portion.

15 Claims, No Drawings

(56) References Cited

U.S. PATENT DOCUMENTS

| | | |
|---|---|---|
| 2010/0081100 A1 | 4/2010 | Olver et al. |
| 2011/0132562 A1 | 6/2011 | Merrill et al. |
| 2012/0058889 A1 | 3/2012 | Nishino et al. |
| 2012/0074122 A1 | 3/2012 | Olver et al. |
| 2013/0168470 A1 | 7/2013 | Olver et al. |
| 2014/0230694 A1 | 8/2014 | Klamklang et al. |

FOREIGN PATENT DOCUMENTS

| | | |
|---|---|---|
| CN | 1785871 A | 6/2006 |
| CN | 101318824 A | 12/2008 |
| CN | 200927697 A | 7/2009 |
| CN | 101508578 A | 8/2009 |
| CN | 101746954 A | 6/2010 |
| CN | 102030476 A | 4/2011 |
| CN | 102503419 A | 6/2012 |
| CN | 102992626 A | 3/2013 |
| CN | 103723926 A | 4/2014 |
| CN | 103803957 A | 5/2014 |
| CN | 04086176 A | 10/2014 |
| TW | 570903 B | 1/2004 |
| TW | 593204 B | 6/2004 |
| TW | 200932701 A | 8/2009 |
| TW | 201228980 A | 7/2012 |
| TW | 201305079 A | 2/2013 |
| TW | 201311597 A | 3/2013 |
| TW | I398424 B | 6/2013 |

OTHER PUBLICATIONS

Colombo et al., "3D ceramic scaffolds by laser sintering (LSD)", Universita degli studi di padova tesi di laurea magistrate in ingegneria dei materiali, Dec. 2011, pp. 62-88.

Hagedorn et al., "SLM of Net-Shaped High Strength Ceramics: New Opportunities for Producing Dental Restorations", Solid Freeform fabrication proceedings, Aug. 17, 2011, pp. 536-546.

Li, "Improvement of Ceramic Laser Sintering Equipment and Study of Process for Manufacturing Alumina Ceramic Workpieces", National Taipei University of Technology, Jul. 2010 pp. i-ix and 1-79.

Regenfuss, et al., "Laser Micro Sintering a Versatile Instrument for the Generation of Microparts", Laser Micro Machining, Jan. 2007, No. 1, pp. 26-31.

Wilkes et al., "Rapid Manufacturing of Ceramic Components for Medical and Technical Applications via Selective Laser Melting", Fraunhofer Institute for Laser Technology ILT prior to Oct. 14, 2015, 6 pages.

CERAMIC POWDER, METHOD OF MANUFACTURING THE SAME, AND METHOD FOR LASER SINTER MOLDING

CROSS-REFERENCE TO RELATED APPLICATION

This application claims the priority benefit of U.S. provisional application Ser. No. 62/067,539, filed on Oct. 23, 2014. The entirety of which is hereby incorporated by reference.

TECHNICAL FIELD

The disclosure relates to a ceramic powder with a core-shell structure, and a method of manufacturing the same, and a method for laser sinter molding by using the same.

BACKGROUND

Most of ceramic products are manufactured by sintering at a high temperature after injection molding, pressure casting, tape casting, or slip casting. However, these techniques need expensive dies and very long preparation time. When the laser additive manufacturing technique is applied to ceramic products, it may reduce costs and shorten preparation time. The ceramic materials have a quite high melting point (for example, the melting point of $ZrO_2$ is 2700° C.), but a transient temperature of laser is merely 1800° C. to 1900° C., thereby hardly directly implementing liquid sintering for pure ceramic materials. In other words, the ceramic products manufactured by laser sinter molding are not dense enough and have a poor mechanical strength. On the other hand, compared to overall sintering of traditional furnace, the ceramic powders manufactured by rapid high-temperature sintering in laser area need to comply with a harsher demand of a thermal shock resistance. When the ceramic materials have a poor thermal shock resistance, the ceramic products are prone to causing cracks and reducing the mechanical strength.

A new ceramic material applied to a method for laser sinter molding is still needed, and this may simultaneously reach the demand of a high product property and a lower process cost.

SUMMARY

One exemplary embodiment of the present disclosure relates to a ceramic powder. The ceramic powder may include a first ceramic core portion having a first flexural strength of 350 MPa to 700 MPa and a first coefficient of thermal expansion of $7.0 \times 10^{-6}$/° C. to $11.0 \times 10^{-6}$/° C.; and a second ceramic shell portion covering the first ceramic core portion and having a second flexural strength of 50 MPa to 350 MPa and a second coefficient of thermal expansion of $-1.0 \times 10^{-6}$/° C. to $3.0 \times 10^{-6}$/° C.

Another exemplary embodiment of the present disclosure relates to a method for laser sinter molding. The method for laser sinter molding may include: forming a ceramic powder layer including an aforementioned ceramic powder; applying a laser to a first region of the ceramic powder layer and sintering the ceramic powder; and removing a second region of the ceramic powder not applied the laser.

Yet another exemplary embodiment of the present disclosure relates to a method of manufacturing a ceramic powder. The method of manufacturing a ceramic powder may include: providing a first ceramic core portion having a first flexural strength of 350 MPa to 700 MPa and a first coefficient of thermal expansion of $7.0 \times 10^{-6}$/° C. to $11.0 \times 10^{-6}$/° C.; forming a first slurry by mixing the first ceramic core portion, a plurality of second ceramic particles, a first binder and water; spraying and drying the first slurry to form a second ceramic shell portion, which being formed by the plurality of second ceramic particles and covering the first ceramic core portion, wherein the second ceramic shell portion has a second flexural strength of 50 MPa to 350 MPa and a second coefficient of thermal expansion of $-1.0 \times 10^{-6}$/° C. to $3.0 \times 10^{-6}$/° C.; and forming the ceramic powder, by thermally treating and shaping the first ceramic core portion and the second ceramic shell portion.

DESCRIPTION OF THE EMBODIMENTS

Below, exemplary embodiments will be described in detail so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

One embodiment of the present disclosure relates to a method of manufacturing a ceramic powder as described below. Firstly, a first ceramic core portion is provided, and the first ceramic core portion has a first flexural strength of 350 MPa to 700 MPa and a first coefficient of thermal expansion of $7.0 \times 10^{-6}$/° C. to $11.0 \times 10^{-6}$/° C. When the first flexural strength of the first ceramic core portion is too low, the mechanical strength of the first ceramic core portion is not sufficient and it is of no value for applicability, such as functional prototypes or biocompatible customized medical devices. It may cause a risk for use when the mechanical strength is no sufficient. In one embodiment, the first ceramic core portion may be, but not limited to aluminum oxide or zirconium oxide doped with yttrium oxide. When the first ceramic core portion is zirconium oxide doped with yttrium oxide, both of the yttrium oxide and the zirconium oxide have a molar ratio of 2.5:100 to 3.5:100. When the molar ratio of the yttrium oxide is too high or too low, the mechanical strength of the first ceramic core portion may become weak. The aforementioned first ceramic core portion has a high flexural strength, a non-toxicity and a high biocompatibility. However, the first ceramic core portion has a melting point higher than 2000° C. and a poor thermal shock resistance, thus, it is not suitable to directly be applied for laser sinter molding.

In one embodiment, a plurality of first ceramic particles may further be provided in the step of providing the first ceramic core portion, wherein a size of the first ceramic particles may be, but not limited to 40 nm to 5 µm. When the size of the first ceramic particles is too small, the cost of ceramic powders is higher. On the other hand, when the size of the first ceramic particles is too large, it cannot form a core portion having a suitable size. A slurry is then formed by mixing the first ceramic particles, a binder and water. In one embodiment, the mixing step may adopt such as a ball milling method. The binder may be, but not limited to a hydrophilic polymer such as polyvinyl alcohol (PVA), polyethylene glycol (PEG), or polymethylmethacrylate (PMMA, acrylic). In one embodiment, the binder may have a weight percentage of about 1% to 3% based on the first ceramic particles. When the weight percentage of the binder is too low, the first ceramic particles cannot form a suitable size. When the weight percentage of the binder is too high, a content of organic material is too high. This may affect the results of subsequent laser sintering. In one embodiment, the first ceramic particles may have a solid content of 30% to 60% based on the aforementioned slurry. When the weight percentage of the water is too high, a viscosity of the slurry is too low to completely dry the slurry during the granulation process. This may lead to the phenomena of powder aggregation, low roundness and small powder size. When the weight percentage of the water is too low, a viscosity of the slurry is too high, thus it may result in a machine blockage and a low efficient granulation. The first ceramic core portion aggregated by the first ceramic particles may be formed by spraying and drying the slurry, then thermally treating and shaping the first ceramic core portion. The temperature of heat setting may be, but not limited to between 1100° C. and 1300° C. When the temperature of heat setting is too low, the first ceramic core portion cannot keep in shape, and is prone to smashing or aggregating to form a smaller or larger size once again. When the temperature of heat setting is too high, the first ceramic particles may proceed a sintering reaction to bond the grain growth powders each other, so as to be not applied for subsequent laser sintering. The first ceramic core portion is aggregated by a plurality of first ceramic particles, and the first ceramic core portion has voids between the plurality of first ceramic particles. In another embodiment, the first ceramic core portion may be directly selected from the first ceramic particles with a suitable particle size so as to have no voids. A size of the selected first ceramic core portion may be, but not limited to 10 μm to 20 μm. When the size of the first ceramic core portion is too small, the ceramic powder has a poor fluidity such that it is not dense enough for the subsequent powder-laying process. There is a high porosity after the laser sintering, and the end-products have a poor mechanical strength. When the size of the first ceramic core portion is too large, the first ceramic core portion is difficult to be sintered and melted by using the laser.

Another slurry is further formed by mixing the first ceramic core portion, a plurality of second ceramic particles, a binder and water. In one embodiment, the second ceramic particles may have a second flexural strength of 50 MPa to 350 MPa and a second coefficient of thermal expansion of $-1.0 \times 10^{-6}/°$ C. to $3.0 \times 10^{-6}/°$ C. Compared to the first ceramic core portion, the flexural strength and the coefficient of thermal expansion of the second ceramic particles are less than those of the first ceramic core portion. When the flexural strength of the second ceramic particles is too low, the overall material has a poor mechanical strength. When the coefficient of thermal expansion of the second ceramic particles is too high, it may cause cracks in the end-product due to the rapid temperature variation by applying a laser such that the end-product has a poor thermal shock resistance. When the coefficient of thermal expansion of the second ceramic particles is too low, the difference between the first ceramic particles and the second ceramic particles is too large, the volume variation when heating is large such that the second ceramic particles cannot completely cover the first ceramic core portion. In one embodiment, the second ceramic particles may be composed of $Li_2O$, $Al_2O_3$ and $SiO_2$. In another embodiment, the second ceramic particles are composed of MgO, $Al_2O_3$ and $SiO_2$. In one embodiment, the second ceramic particles may be composed of 5 to 40 mol % $Li_2O$, 5 to 25 mol % $Al_2O_3$ and 45 to 90 mol % $SiO_2$, such as eucryptite ($Li_2O \cdot Al_2O_3 \cdot 2SiO_2$) or spodumene ($Li_2O \cdot Al_2O_3 \cdot 4SiO_2$). Yet in another embodiment, the second ceramic particles may be composed of 15 to 45 mol % MgO, 5 to 25 mol % $Al_2O_3$ and 45 to 70 mol % $SiO_2$, such as cordierite ($2MgO \cdot 2Al_2O_3 \cdot 5SiO_2$). The second ceramic particles have a lower coefficient of thermal expansion and a larger thermal shock resistance, and are homogeneous nucleation crystal. The sintered product using the second ceramic particles has a small porosity and cracks, and the second ceramic particles have a low glass transition temperature. However, the second ceramic particles have mechanical strength less than that of the first ceramic core portion. When applied for laser sintering, the second ceramic particles are promptly melted so as not to be effectively laminated, therefore, laser sintering molding cannot be applied to the second ceramic particles. In one embodiment, a size for the second ceramic particles may be, but not limited to 1 μm to 3 μm. When the size of the second ceramic particles is too large, it is not dense enough to cover the first ceramic core portion so as to expose the first ceramic core portion or have a poor roundness.

The step of mixing the first ceramic core portion, a plurality of second ceramic particles, a binder and water may be implemented by such as a ball milling process. In one embodiment, a weight ratio of the first ceramic core portion to the second ceramic shell portion is in the range of 90:10 to 60:40. When the weight of the first ceramic core portion is too high, the sintered product using the ceramic powder thereof has a higher surface roughness and larger cracks (such as with a width more than 2 μm). When the weight of the second ceramic particles is too high, it is difficult to form lamination in the laser sintering process. In one embodiment, the binder may be, but not limited to hydrophilic polymer such as polyvinyl alcohol, polyethylene glycol (PEG), or polymethyl methacrylate (PMMA, acrylic). In one embodiment, the binder may have a weight percentage of around 1% to 3% based on a total weight of the first ceramic core portion and the second ceramic particles. When the weight percentage of the binder is too low, it is difficult to form ceramic powders with a core-shell structure. When the weight percentage of the binder is too high, a content of organic material is too high. This may affect the results of subsequent laser sintering. In one embodiment, the first ceramic core portion and the second ceramic particles may have a total solid content of 30% to 60% based on the aforementioned slurry. When the weight percentage of the water is too high, a viscosity of the slurry is too low to completely dry the slurry during the granulation process. This may lead to the phenomena of powder aggregation, low roundness and small powder size. When the weight percentage of the water is too low, a viscosity of the slurry is too high. This may result in a machine blockage and a low efficient granulation.

Then, a second ceramic shell portion is formed by spraying and drying the aforementioned slurry, wherein the second ceramic shell portion is formed by the plurality of second ceramic particles and covers the first ceramic core portion. In one embodiment, the first ceramic core portion is aggregated by the plurality of first ceramic particles, and the plurality of second ceramic particles can fill the partial voids between the plurality of first ceramic particles. After the second ceramic shell portion is formed, a ceramic powder is formed by thermally treating and shaping the first ceramic core portion and the second ceramic shell portion. In one embodiment, the temperature of heat setting may be, but not limited to between 1000° C. and 1100° C. When the temperature of heat setting is too high, the second ceramic particles may be completely melted and fail to cover the first ceramic core portion. When the temperature of heat setting is too low, the second ceramic shell portion cannot be shaped and is prone to smashing in the subsequent process. Finally, this ceramic powder shaped has a core-shell structure and has a size of 14 μm to 28 μm. When the size of the ceramic powder is too small, it may affect the laminated efficiency in the subsequent laser sintering. When the size of the ceramic powder is too large, it is difficult to completely melt and sinter the ceramic powder by using the laser. The aforementioned ceramic powder is compressed and molded, and further sintered by a sintering method. After the sintering, the obtained bulk material is analyzed for a thermal shock resistance test, and a test result indicates this bulk material has a critical temperature difference of 250° C. for the thermal shock resistance. In other words, the aforementioned ceramic powder with the core-shell structure is a material having a high thermal shock resistance.

One embodiment of the present disclosure relates to a method for laser sinter molding utilizing the aforementioned ceramic powder as described below. Firstly, a ceramic powder layer is formed by using the ceramic powder, and the laminated method may adopt a scraper to define the thickness of a ceramic powder layer. In one embodiment, a ceramic powder layer may have a thickness of 20 μm to 60 μm. When the thickness of the ceramic powder layer is too thick, it is difficult to sinter the ceramic powder or these ceramic powder layers cannot be adhered between themselves. When the thickness of the ceramic powder layer is too thin, it may affect the laminated efficiency. After one ceramic powder layer is formed, a laser is applied to a region of the ceramic powder layer to sinter the ceramic powder, and it may subsequently repeat the above step to form another ceramic powder layer on the ceramic powder layer sintered by the laser. And a laser is applied to a region of said another ceramic powder layer to sinter said another ceramic powder again. After repeating the above step several times, the regions of these ceramic powder layers sintered by the laser are laminated to form a three-dimensional pattern. And, the regions of which the ceramic powder not sintered by the laser may be removed by such as a sweeping method and the removed regions may be recycled and reused. In one embodiment, the laser may have a power of 3 W to 30 W. When the power of the laser is too weak, the ceramic powder cannot be sintered. When the power of the laser is too high, the laminated powder may be hit and disappeared, such that the ceramic powder cannot be sintered, or the second ceramic shell portion is completely melted such that the laminated efficiency becomes worse. In one embodiment, the laser may be, but not limited to a $CO_2$ laser with a wavelength of 10640 nm, and the ceramic powder may have an absorption effect for the aforementioned wavelength such that the light energy is effectively converted into a heat energy to sinter the ceramic powder. However, the overall processing parameters such as scanning speed, laser power, energy density and powder size may affect each other. For example, the sintering effect of a low speed with a high power is the same as that of a high speed with a low power. For example, the laser may have an energy density of 150 pulses/inch to 1400 pulses/inch. In one embodiment of the present disclosure, the product after using the present method for laser sinter molding may have a crack width of 0 μm to 1 μm (i.e. the ceramic powder layer after the laser sintering may have a crack width of 0 μm to 1 μm). In another embodiment of the present disclosure, one single sintered layer may have a surface roughness of 3 μm to 5 μm, and the surface roughness may increase as the number of laminated layers increases.

The following exemplary embodiments illustrate the disclosure in more detail, so as to be easily realized by a person having ordinary knowledge in the art. The inventive concept may be embodied in various forms without being limited to the exemplary embodiments set forth herein.

Exemplary Embodiment 1 of the Disclosure

Appropriate stoichiometry of $Li_2CO_3$ (19.24 g), $Al_2O_3$ (26.02 g) and $SiO_2$ (61.61 g) were weighted and mixed with a fluxing agent (2.54 g of $B_2O_3$ and 1.73 g of $H_3PO_4$) by a ball milling process. The mixed powders were dried at 100° C. and the dried powders were sintered at 1300° C. to form $Li_2O \cdot Al_2O_3 \cdot 4SiO_2$. Then, these powders are further refined to form particles having a particle size of 1 μm to 3 μm as the ceramic particles of the following shell portion.

130 g of zirconium oxide particles doped with 3 mol % of yttrium oxide (particle size of 50 nm), 2.6 g of polyvinyl alcohol (MW 2,000, bought from SCIENTIFIC POLYMER PRODUCTS, INC.), and 130 g of water were weighted and mixed by a ball milling process to form a slurry, and the slurry was sprayed and dried to form a core portion aggregated by the zirconium oxide particles doped with yttrium oxide. Then, the core portion is thermally treated and shaped at 1200° C. (particle size of 10 μm to 20 μm).

60 g of the core portion formed by zirconium oxide particles doped with yttrium oxide, 40 g of $Li_2O \cdot Al_2O_3 \cdot 4SiO_2$ particles, 2 g of polyvinyl alcohol (MW 2,000, bought from SCIENTIFIC POLYMER PRODUCTS, INC.), and 100 g of water were weighted and mixed by a ball milling process to form a slurry, and the slurry was sprayed and dried to form a core portion formed by zirconium oxide particles doped with yttrium oxide and covered by the shell portion aggregated by $Li_2O \cdot Al_2O_3 \cdot 4SiO_2$ particles. Then, the aforementioned ceramic powders with the core-shell structure are thermally treated and shaped at 1100° C. (particle size of about 25 μm).

Then, the shaped ceramic powders were used to form a ceramic powder layer (thickness of 40 μm) by a scraper, and the ceramic powder layer was sintered by a $CO_2$ laser (20 cm/s, 3 W). The surface roughness (Ra of 10.59 μm) and the crack width (458.3 nm) of the ceramic powder layer after the laser sintering were measured by a surface roughness instrument (ET-3000 Surface Profiler manufactured by Kosaka Laboratory Ltd.) and a scanning electron microscope (LEO 1530 Field Emission Scanning Electron Microscopy), respectively.

Comparison 1

60 g of zirconium oxide particles doped with yttrium oxide (particle size of 50 nm), 40 g of $Li_2O \cdot Al_2O_3 \cdot 4SiO_2$ particles (particle size of 1 μm to 3 μm), 2 g of polyvinyl alcohol (MW 2,000, bought from SCIENTIFIC POLYMER PRODUCTS, INC.), and 100 g of water were directly weighted and mixed. Subsequently, the mixture was used to form a mixture layer (thickness of 40 μm) by a scraper, and the mixture layer was sintered by a $CO_2$ laser (20 cm/s, 3 W). The surface roughness (more than 100 μm) and the crack width (9.648 μm) of the mixture layer after the laser sintering were measured by a surface roughness instrument and a scanning electron microscope, respectively. Compared to the Exemplary embodiment 1 with Comparison 1, the sintered product formed by the ceramic powder with the core-shell structure has a less surface roughness and a crack width than those of the sintered product formed by the mixture powder.

Exemplary Embodiment 2 of the Disclosure

Similar to Exemplary embodiment 1, except that the weight ratio of the core portion formed by zirconium oxide particles doped with yttrium oxide to $Li_2O \cdot Al_2O_3 \cdot 4SiO_2$ particles was 90 g/10 g (9/1) instead of 60 g/40 g (6/4). The amounts of other materials, temperature of heat setting and parameters of laser sintering were the same with those of Exemplary embodiment 1. The ceramic powder in Exemplary embodiment 2 had a particle size of 14 μm to 28 μm. The ceramic powder layer after the laser sintering had a surface roughness of about 10 μm and a crack width of about 2.141 μm.

Exemplary Embodiment 3 of the Disclosure

The appropriate stoichiometry of $Mg(OH)_2$ (18.94 g), $Al_2O_3$ (33.11 g) and $SiO_2$ (48.45 g) were weighted and mixed with a fluxing agent (2.54 g of $B_2O_3$ and 1.73 g of $H_3PO_4$) by a ball milling process. The mixed powders were dried at 100° C. and the dried powders were sintered at 1300° C. to form $2MgO \cdot 2Al_2O_3 \cdot 5SiO_2$. Then, these dried powders were refined to form particles having a particle size of 1 μm to 3 μm as the ceramic particles of the following shell portion.

130 g of zirconium oxide particles doped with 3 mol % of yttrium oxide (particle size of 50 nm), 2.6 g of polyvinyl alcohol (MW 2,000, bought from SCIENTIFIC POLYMER PRODUCTS, INC.), and 130 g of water were weighted and mixed by a ball milling process to form a slurry, and the slurry was sprayed and dried to form the core portion aggregated by the zirconium oxide particles doped with yttrium oxide. The core portion is then thermally threated and shaped at 1200° C. (particle size of 10 μm to 20 μm).

60 g of the core portion formed by zirconium oxide particles doped with yttrium oxide, 40 g of $2MgO \cdot 2Al_2O_3 \cdot 5SiO_2$ particles, 2 g of polyvinyl alcohol (MW 2,000, bought from SCIENTIFIC POLYMER PRODUCTS, INC.), and 100 g of water were weighted and mixed by a ball milling process to form a slurry, and the slurry was sprayed and dried to form the core portion formed by zirconium oxide particles doped with yttrium oxide and covered by the shell portion aggregated by $2MgO \cdot 2Al_2O_3 \cdot 5SiO_2$ particles. The aforementioned ceramic powders with the core-shell structure is then thermally treated and shaped at 1100° C. (particle size of about 25 μm).

The above ceramic powders were used to form a ceramic powder layer (thickness of 40 μm) by a scraper, and the ceramic powder layer was sintered by a $CO_2$ laser (60 cm/s, 6 W). The surface roughness (28.15 μm) and the crack width (less than 1 μm) of the ceramic powder layer after the laser sintering were measured by a surface roughness instrument and a scanning electron microscope.

Comparison 2

60 g of zirconium oxide particles doped with yttrium oxide (particle size of 50 nm), 40 g of $2MgO \cdot 2Al_2O_3 \cdot 5SiO_2$ particles (particle size of 1 μm to 3 μm), 2 g of polyvinyl alcohol (MW 2,000, bought from SCIENTIFIC POLYMER PRODUCTS, INC.), and 100 g of water were directly weighted and mixed. Subsequently, the mixture was used to form a mixture layer (thickness of 40 μm) by a scraper, and the mixture layer was sintered by a $CO_2$ laser (60 cm/s, 6 W). The surface roughness (more than 100 μm) and the crack width (2 μm to 10 μm) of the mixture layer after the laser sintering were measured by a surface roughness instrument and a scanning electron microscope, respectively. Compared to Exemplary embodiment 2 with Comparison 2, the sintered product formed by the ceramic powder with the core-shell structure has a less surface roughness and a crack width than those of the sintered product formed by the mixture powder.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A ceramic powder, comprising:
   a first ceramic core portion having a first flexural strength of 350 MPa to 700 MPa and a first coefficient of thermal expansion of $7.0 \times 10^{-6}/°$ C. to $11.0 \times 10^{-6}/°$ C.; and
   a second ceramic shell portion covering the first ceramic core portion and having a second flexural strength of 50 MPa to 350 MPa and a second coefficient of thermal expansion of $-1.0 \times 10^{-6}/°$ C. to $3.0 \times 10^{-6}/°$ C.

2. The ceramic powder of claim 1, wherein a weight ratio of the first ceramic core portion to the second ceramic shell portion is in the range of 90:10 to 60:40.

3. The ceramic powder of claim 1, wherein the first ceramic core portion has a size of 10 μm to 20 μm, and the ceramic powder has a size of 14 μm to 28 μm.

4. The ceramic powder of claim 1, wherein the first ceramic core portion further includes aluminum oxide or zirconium oxide doped with yttrium oxide, and the second ceramic shell portion further includes $Li_2O \cdot Al_2O_3 \cdot 2SiO_2$, $Li_2O \cdot Al_2O_3 \cdot 4SiO_2$ or $2MgO \cdot 2Al_2O_3 \cdot 5SiO_2$.

5. The ceramic powder of claim 1, wherein the first ceramic core portion is formed by a plurality of first ceramic particles, and the first ceramic particles have a size of 40 nm to 5 μm.

6. The ceramic powder of claim 1, wherein the second ceramic shell portion is formed by a plurality of second ceramic particles, and the second ceramic particles have a size of 1 μm to 3 μm.

7. A method for laser sinter molding, comprising:
   forming a ceramic powder layer including a ceramic powder of claim 1;
   applying a laser to a first region of the ceramic powder layer and sintering the ceramic powder; and
   removing a second region of the ceramic powder not applied the laser.

8. The method of claim 7, wherein the ceramic powder layer after a laser sintering has a crack width of 0 μm to 1 μm.

9. The method of claim 7, wherein the laser is a $CO_2$ laser with a wavelength of 10640 nm, and has a power of 3 W to 30 W and an energy density of 150 pulses/inch to 1400 pulses/inch.

10. A method of manufacturing a ceramic powder, comprising:
    providing a first ceramic core portion having a first flexural strength of 350 MPa to 700 MPa and a first coefficient of thermal expansion of $7.0 \times 10^{-6}/°$ C. to $1.0 \times 10^{-6}/°$ C.;
    forming a first slurry by mixing the first ceramic core portion, a plurality of second ceramic particles, a first binder and water;
    spraying and drying the first slurry to form a second ceramic shell portion formed by the second ceramic particles and covering the first ceramic core portion, wherein the second ceramic shell portion has a second flexural strength of 50 MPa to 350 MPa and a second coefficient of thermal expansion of $-1.0 \times 10^{-6}/°$ C. to $3.0 \times 10^{-6}/°$ C.; and
    forming the ceramic powder by thermally treating and shaping the first ceramic core portion and the second ceramic shell portion.

11. The method of claim 10, wherein the first ceramic core portion has a size of 10 μm to 20 μm, and the second ceramic particles have a size of 1 μm to 3 μm.

12. The method of claim 10, wherein a weight ratio of the first ceramic core portion to the second ceramic shell portion is in a range of 90:10 to 60:40.

13. The method of claim 10, wherein in the step of forming the first slurry, the first binder has a weight percentage of 1% to 3% based on a total weight of the first ceramic core portion and the second ceramic particles, and the first ceramic core portion and the second ceramic particles have a total solid content of 30% to 60% based on the first slurry.

14. The method of claim 10, wherein the step of providing the first ceramic core portion further includes:
- forming a second slurry by mixing a plurality of first ceramic particles, a second binder and water, wherein the first ceramic particles have a size of 40 nm to 5 μm;
- spraying and drying the second slurry to form the first ceramic core portion formed by the first ceramic particles; and
- thermally treating and shaping the first ceramic core portion.

15. The method of claim 14, wherein in the step of forming the second slurry, the second binder has a weight percentage of 1% to 3% based on the first ceramic particles, and the first ceramic particles have a solid content of 30% to 60% based on the second slurry.

* * * * *